United States Patent [19]

Groenhof

[11] 4,341,752
[45] Jul. 27, 1982

[54] METHOD FOR PURIFICATION AND CONCENTRATION OF MGCL$_2$-BRINES

[75] Inventor: Hendrik C. Groenhof, Oslo, Norway

[73] Assignee: Norsk Hydro a.s., Oslo, Norway

[21] Appl. No.: 243,453

[22] Filed: Mar. 13, 1981

[30] Foreign Application Priority Data

Apr. 18, 1980 [NO] Norway ................................ 801137
Jun. 11, 1980 [NO] Norway ................................ 801737

[51] Int. Cl.$^3$ .............................................. C01D 3/06
[52] U.S. Cl. .................................... 423/497; 423/554; 23/304; 423/163; 423/178
[58] Field of Search ............... 423/497, 178, 163, 554; 23/304

[56] References Cited

U.S. PATENT DOCUMENTS 2,479,001 8/1949 Burke et al. .......................... 423/497
3,829,559 8/1974 Dancy ................................... 423/497

Primary Examiner—Earl C. Thomas
Attorney, Agent, or Firm—Wenderoth, Lind & Ponack

[57] ABSTRACT

Method for producing purified and concentrated MgCl$_2$-brine by evaporation and crystallization from brines containing MgCl$_2$, KCl, NaCl and MgSO$_4$ involving recirculation of carnallite and part of the final product brine. The carnallite is recirculated to a decomposition step (1) into which the whole or part of the crude brine is also introduced while part of the final product brine is recycled to the evaporation step (2). The method results in a pure end product by a simple process comprising only one evaporation step and without any addition of chemicals.

5 Claims, 2 Drawing Figures

METHOD FOR PURIFICATION AND CONCENTRATION OF MGCL$_2$-BRINES

BACKGROUND OF THE INVENTION

Field of the invention

The invention relates to a method for producing purified and concentrated MgCl$_2$-brine by evaporation and crystallization from brines containing MgCl$_2$, KCl, NaCl and MgSO$_4$.

Description of the prior art

Different methods for purification and concentration of magnesium containing brines are known from the patent literature. Large quantities of such brines are obtained as a by-product from the production of potassium chloride, potassium sulphate and sodium chloride. Such brines can be purified and concentrated in different ways in order to obtain a highly concentrated MgCl$_2$-brine, with a low content of KCl, NaCl and MgSO$_4$, which is suitable as a raw material for the production of magnesium metal or magnesium oxide.

German Pat. No. 676406 shows how solutions with less than 320 g/l magnesium chloride can be evaporated until saturation with carnallite is reached. The sodium chloride-kieserite mixture which crystallizes due to evaporation is then separated, the hot brine is cooled and the carnallite which crystallizes due to cooling is separated from the product brine. However, the solutions obtained in this manner still contain about 1% potassium- and sodium chloride and considerable quantities of magnesium sulphate. The sulphate ions have to be removed by precipitation with lime. After further evaporation additional mixtures of carnallite and kieserite have to be separated from the brine at temperatures up to 130° C., before a concentrated brine of sufficient purity is obtained by cooling and separation of a crystalline carnallite/sodium chloride mixture.

In German Patent No. 1667826 it is proposed to concentrate magnesium chloride brines containing sulphates by evaporation under vacuum at temperatures of 60°–90° C., and subsequent heating of the solution at atmospheric or slightly elevated pressure to 108°–130° C., followed by isothermal removal of the sulphate compound and cooling of the solution obtained to 25° C. The solution is then concentrated to 50 weight % magnesium chloride hexahydrate by vacuum evaporation at 60°–90° C. After cooling crystalline Bischofite is obtained.

From German Offenlegungsschrift No. 2613288 it is known that a highly concentrated magnesium chloride solution can be obtained after debromination with chlorine, sulphate precipitation with calcium chloride, increasing the magnesium chloride content to 270–330 g/l by carnallite decomposition, and subsequent concentration by evaporation and cooling to ambient temperature, resulting in the crystallization of carnallite. The solution which is obtained after removal of the crystals is the required concentrated brine product.

According to German Pat. No. 2613289 a highly concentrated magnesium chloride solution can be obtained from dilute solutions by evaporation to 440–475 g/l magnesium chloride, separation of carnallite and sodium chloride, debromination with chlorine, subsequent precipitation of sulphates by means of a lime- or dolomite suspension, separation of the precipitate, followed by crystallization of a mixture of carnallite/sodium chloride by cooling. It is claimed that the formation of sulphate containing double salts, which would lead to loss of potassium values, is prevented by this method.

In German Patent No. 2513947 on the other hand the formation of sulphate containing langbeinite is desired. After evaporation of the solution the crystallization of langbeinite is promoted by nucleation by addition of langbeinite crystals. After further evaporation and subsequent cooling crystallization carnallite is separated from the product brine and contacted with the crude brine for decomposition. The sulphate salts are converted to potassium sulphate.

SUMMARY OF THE PRESENT INVENTION

The present invention involves recirculation of carnallite and part of the final product brine in the process of purification and concentration of MgCl$_2$-brines. The improvement of the method of the present invention results from recycling of part of the final product brine to an evaporation step which is followed by a cooling crystallization step.

It is therefore an object of the invention to produce a concentrated magnesium chloride brine of a sufficient purity by a very simple process for purification and concentration of MgCl$_2$-brines comprising only one evaporation step and without any addition of chemicals.

It is a further object of the present invention to produce a product brine of high purity with a low content of MgSO$_4$.

It is still a further object of the present invention to provide a method for purification and concentration of MgCl$_2$-brines characterized by low potassium losses. No potassium containing double salts, such as langbeinite or carnallite, are formed in the evaporation step.

The foregoing and other objects of the present invention will be described more fully in the following more detailed description.

DESCRIPTION OF THE PREFERRED EMBODIMENTS

The improvement in accordance with the method of the present invention involves the steps of:
1. Decomposition of carnallite in crude brine, followed by filtration of a NaCl/KCl crystal mixture.
2. Mixing of recycled product brine with brine from step 1, evaporation of the resulting brine and subsequent separation of a mixture of kieserite and sodium chloride crystals.
3. Crystallization, separation of carnallite and NaCl crystals and recycling of the crystal mixture to step 1.

In case the crude brine is nearly saturated with carnallite it may be necessary to feed some water to step 1 in order to avoid saturation with carnallite.

Figure 2:
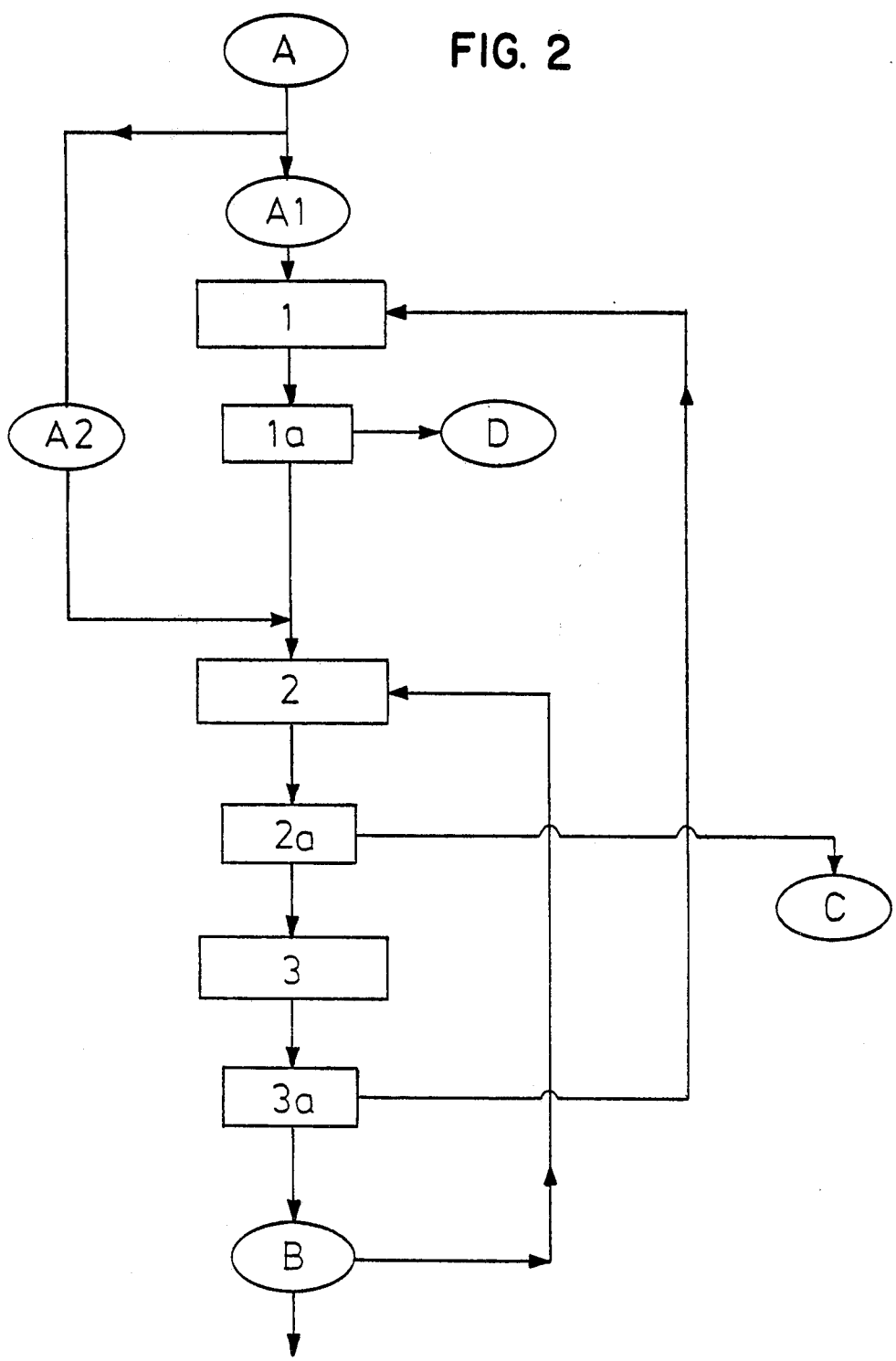
FIG. 2 shows a variant flow-sheet of the method shown in FIG. 1.

In one alternative embodiment of the present invention only part of the crude brine is used for decomposition of the recycled carnallite in step 1. This is done by means of a by-pass as shown in FIG. 2—stream A2.

Figure 1:
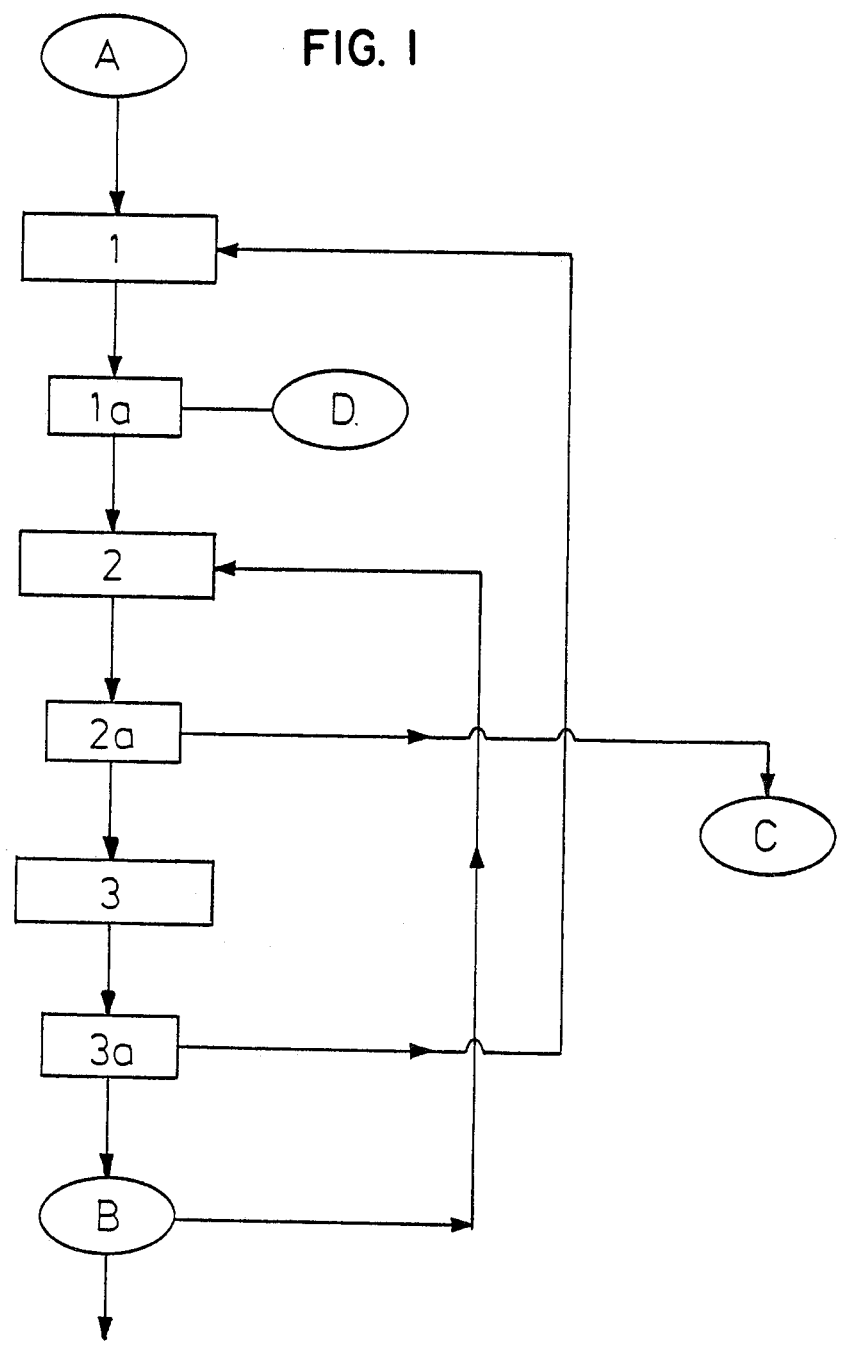
FIG. 1 is a schematic flow-sheet of the present method.

The foregoing characteristic of the improved method of the present invention will be described in more detail by reference to the attached drawings, FIG. 1 and FIG. 2, and the examples which are presented below.

1. A brine (A) containing magnesium chloride, sodium chloride, potassium chloride and magnesium sulphate is mixed with a mixture of carnallite ($MgCl_2.KCl.6\ H_2O$) and sodium chloride crystals from cooling step 3. The carnallite is decomposed. The temperature of the suspension in this decomposition step 1 is kept in the range of 20° to 55° C. Normally it will be advantageous to carry out the decomposition at a temperature in the range of 35° to 55° C. and then cool to 20°–30° C. in order to establish a low KCl concentration in the brine prior to filtration.

The magnesium chloride concentration in the brine after carnallite decomposition should be less than 310–325 g/l, dependent on the temperature. The crystal mass in suspension, which is a mixture of potassium and sodium chloride (D), is separated from the brine in a filtration step 1a and can than be converted to a commercial potassium chloride grade by means of known techniques.

2. Brine from step 1 is mixed with recycled product brine in evaporation step 2 in order to achieve a favourable composition of the resulting brine prior to evaporation. The magnesium chloride content increases to 310–380 g/l. The sulphate concentration ($MgSO_4$) in the liquid phase is lowered due to mixing with product brine. By means of this recycle the formation of potassium sulphate or -chloride containing double salts during evaporation can be prevented.

The resulting brine is concentrated to 430–460 g/l by evaporation at a final temperature in the range of 125° to 135° C. at approximately 1 bara. The evaporation is conducted in a manner known per se, e.g. multiple effect evaporation. Sodium chloride and kieserite crystals are formed. The evaporation is terminated before saturation with carnallite is reached.

The slurry should be kept near its boiling point for several hours in order to secure the lowest possible $MgSO_4$ content in the brine before filtration (2a). After filtration the kieserite by-product (C) can be utilized in the production of potassium sulphate by means of known techniques.

3. The clarified solution from evaporation step 2 is cooled by vacuum cooling, indirect cooling, or a combination of these techniques, to 20°–35° C. in crystallization step 3. A suspension is formed in this manner, containing carnallite and some sodium chloride. The crystals are separated from the brine by filtration (3a) and recycled to step 1. The highly concentrated $MgCl_2$ brine (440–460 g/l) which is obtained is partly recycled to evaporation step 2. The main part of the product brine (B) is available for use as the raw material for the production of magnesium products.

EXAMPLE 1

Crude brine containing 275 g/l $MgCl_2$, 23 g/l $MgSO_4$, 54 g/l KCl, 35 g/l NaCl and impurities has been concentrated and purified in accordance with the present invention.

Step 1

Feed rate: 470 l/h of crude brine
  Addition of 65 kg/h carnallite
    ($MgCl_2.KCl.6\ H_2O$) and 6 kg/h NaCl
Decomposition temperature: 35° C.
After decomposition the slurry was cooled to 25° C.
Brine composition:
  $MgCl_2$ 310 g/l
  $MgSO_4$ 22 g/l
  KCl 37 g/l
  NaCl 32 g/l
Crystal mixture separated from the brine:
  KCl 24 kg/h
  NaCl 7 kg/h

Step 2

Addition of 140 l/h of product brine.
Brine composition prior to evaporation:
  $MgCl_2$ 341 g/l
  $MgSO_4$ 19 g/l
  KCl 29 g/l
  NaCl 26 g/l
Evaporation at a temperature of 130° C.
Brine composition:
  $MgCl_2$ 450 g/l
  $MgSO_4$ 13 g/l
  KCl 38 g/l
  NaCl 16 g/l
Crystal mixture separated from the brine:
  Kieserite 7 kg/h
  NaCl 9 kg/h

Step 3

Brine from step 2 was subjected to:
(1) Cooling under vacuum down to 80° C., and
(2) Indirect cooling to 25° C.
Brine composition (B):
  $MgCl_2$ 450 g/l
  $MgSO_4$ 14 g/l
  KCl 2 g/l
  NaCl 5 g/l A mixture of carnallite and NaCl was filtered off, washed and recycled to step 1. Part of the product brine was recycled to step 2.

EXAMPLE 2

During this test run in the pilot plant only a part of the crude brine was used for the decomposition of the recycled carnallite (FIG. 2).
Feed rate: 460 l/h of crude brine
Crude brine composition (A):
  $MgCl_2$ 268 g/l
  $MgSO_4$ 23 g/l
  KCl 61 g/l
  NaCl 36 g/l

Step 1

Addition of 110 kg/h of a filter cake containing 72 wt.% carnallite and 4.5 wt.% NaCl to 360 l/h of the crude brine. The decomposition temperature was 45° C. After decomposition the slurry was cooled to 27° C.
Brine composition after cooling:
  $MgCl_2$ 312 g/l
  $MgSO_4$ 20 g/l
  KCl 37 g/l
  NaCl 31 g/l
Crystal mixture separated from the brine:
  NaCl 5 kg/h
  KCl 27,5 kg/h

Step 2

Addition of 120 l/h of product brine (B) to the mixture of brine from step 1 (A 1) and by-passed crude brine (A 2).

Brine composition prior to evaporation:
  $MgCl_2$ 333 g/l
  $MgSO_4$ 20 g/l
  KCl 34 g/l
  NaCl 27 g/l Evaporation at a temperature of 129° C.

Brine composition:
  $MgCl_2$ 445 g/l
  $MgSO_4$ 13 g/l
  KCl 46 g/l
  NaCl 15 g/l Crystal mixture separated from the brine:
  Kieserite 7 kg/h
  NaCl 10 kg/h

Step 3

The brine from step 2 was subjected to:
(1) Cooling under vacuum to 75° C., and
(2) Indirect cooling to 30° C.

Brine composition (B):
  $MgCl_2$ 455 g/l
  $MgSO_4$ 15 g/l
  KCl 2 g/l
  NaCl 6 g/l A mixture of carnallite and NaCl was filtered off and recycled to step 1. Part of the product brine was recycled to step 2.

Since the present invention is subject to many variations and modifications, it is intended that all matter described above or shown in accompanying drawings shall be interpreted as illustrative and not in a limiting sense.

I claim:

1. A method for purifying and concentrating a crude magnesium chloride-containing brine which also contains magnesium sulphate, potassium chloride and sodium chloride, which method comprises the steps of:
    (1) mixing crude magnesium chloride-containing brine (A) with carnallite and sodium chloride from step (3) below and decomposing the carnallite;
    (1a) separating crystals of potassium and sodium chloride from the resulting brine;
    (2) adding to the resulting brine a quantity of purified and concentrated magnesium chloride-containing brine from step (3) below and evaporating the brine to cause sodium chloride and kieserite crystals to form;
    (2a) separating the thus produced sodium chloride and kieserite crystals from the brine to obtain a solution;
    (3) Cooling the solution to cause sodium chloride and carnallite crystals to form;
    (3a) separating the resulting sodium chloride and carnallite from the solution and feeding the sodium chloride and carnallite to step (1) above and feeding a portion of the purified and concentrated magnesium chloride-containing brine product to step (2).

2. The method of claim 1 wherein the aid decomposition of recycled carnallite takes place in a decomposition step (1) into which all the crude brine (A) is introduced.

3. The method of claim 1 wherein the said decomposition of recycled carnallite takes place in a decomposition step (1) into which a part of the crude brine (A) is introduced, the remaining crude brine by-passing step (1) and is introduced into step (2).

4. The method of claim 2 wherein the said decomposition of carnallite takes place at a temperature in the range of 20° C. to 55° C.

5. The method of claim 3 wherein the said decomposition of carnallite takes place at a temperature in the range of 20° C. to 55° C. and the decomposition is conducted to obtain an increase of the $MgCl_2$ concentration in the brine to 310–325 g/l.

* * * * *